W. G. SHAW.
SHEET DRAWING APPARATUS.
APPLICATION FILED JAN. 2, 1918.
1,359,200.
Patented Nov. 16, 1920.
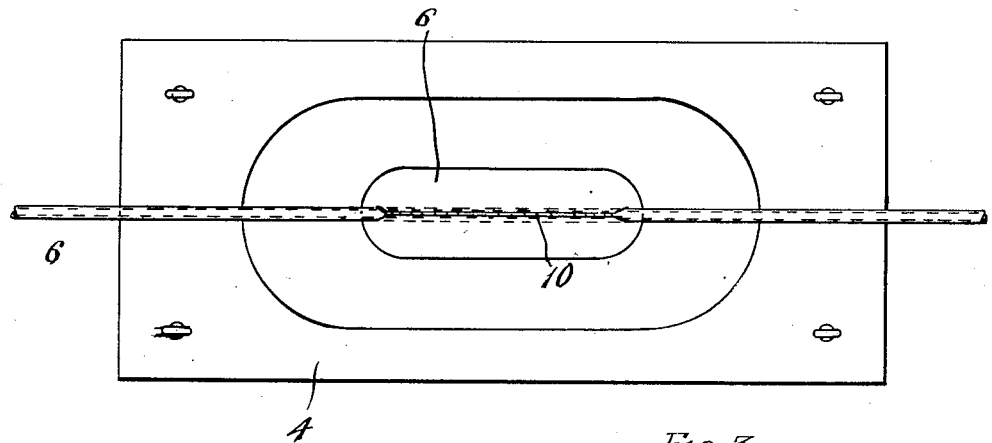
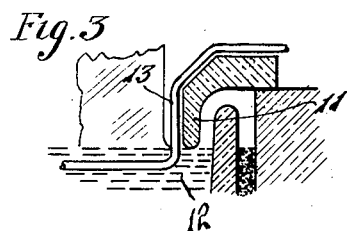
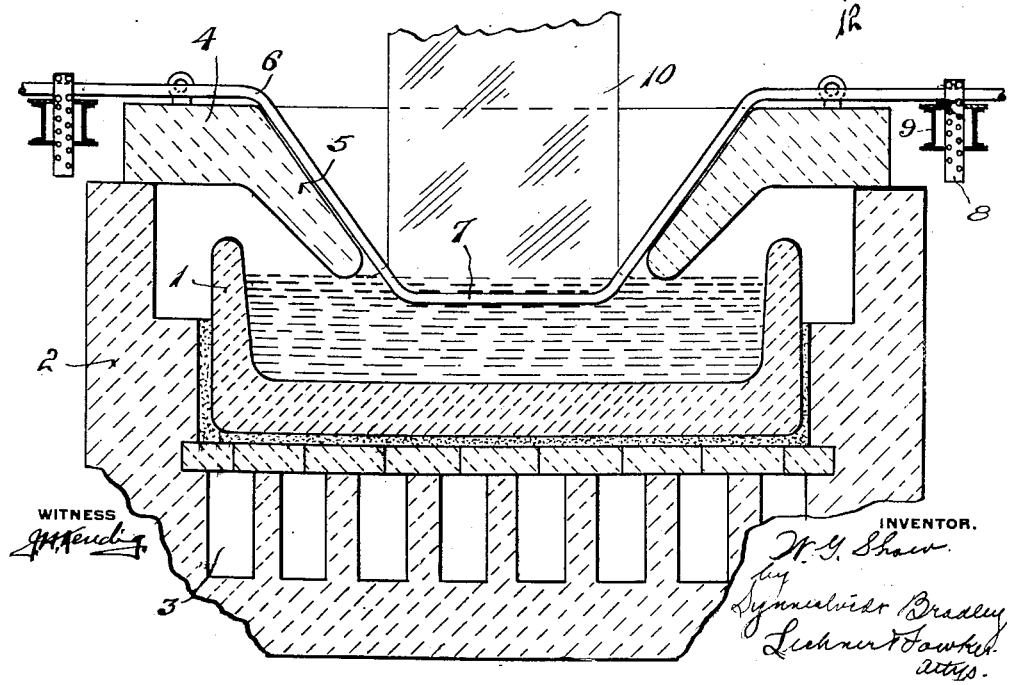

UNITED STATES PATENT OFFICE.

WILLIAM G. SHAW, OF CREIGHTON, PENNSYLVANIA, ASSIGNOR TO PITTSBURGH PLATE GLASS COMPANY, A CORPORATION OF PENNSYLVANIA.

SHEET-DRAWING APPARATUS.

1,359,200.        Specification of Letters Patent.     Patented Nov. 16, 1920.

Application filed January 2, 1918. Serial No. 209,836.

*To all whom it may concern:*

Be it known that I, WILLIAM G. SHAW, a citizen of the United States, residing at Creighton, in the county of Allegheny and State of Pennsylvania, have invented certain new and useful Improvements in Sheet Drawing Apparatus, of which the following is a specification.

The invention relates to apparatus for drawing glass in sheet form, and has for its principal objects; the provision of an improved means for defining the sheet and securing a chilling action in the glass from which the sheet is drawn; and the provision of improved means for increasing the viscosity of the glass beneath the line of generation and promoting the speed at which the drawing action may be carried on. One embodiment of the invention is illustrated in the accompanying drawing, wherein—

Figure 1 is a vertical section through the apparatus to which the invention relates; Fig. 2 is a plan view of the drawing shield or slot member; and Fig. 3 is a partial section through a modification.

The glass from which the drawing occurs is carried in a receptacle 1 of fire clay or other suitable refractory material, the receptacle itself being supported in the brickwork 2 which is provided with the flues or passages 3. The construction of this container for the glass is not important in so far as the present invention is concerned, the only requirement being that a container should be provided capable of maintaining the glass therein at a proper temperature for drawing.

Mounted upon the top of the construction 2 is the shield member 4, which is made of refractory material such as clay, and is provided with downwardly and inwardly extending walls 5 preferably terminating at the surface of the glass or closely adjacent thereto. This member provides the shielded opening 6 (Fig. 2) through which the drawing of the sheet occurs.

In order to cool the glass along the line of drawing and beneath the line of generation of the sheet, the conduit or pipe 6ª is provided, such pipe preferably following the contour of the slot or shield member and having its central portion 7 located beneath the surface of the glass. This pipe is designed to carry a cooling fluid, preferably water. The depth at which the conduit is located below the surface of the glass will depend upon conditions, including the temperature of the glass, the size of the pipe employed and the quantity of cooling fluid which is passed therethrough. The vertical position of the pipe may be regulated by means of the perforated plates 8 which are secured at their upper ends to the conduit 6ª and which are supported upon the beams 9. Pins may be thrust through the perforations in the plates to engage the beams and thus support the plates at varying heights. Any other suitable means might be employed for giving the necessary adjustment.

The drawing of the sheet of glass 10 is initiated by dipping a bait in the glass above the portion 7 of the pipe and then drawing it upward in the usual way. The glass lying above the portion 7 of the pipe is chilled and rendered more viscous by reason of the cooling fluid in the pipe, so that the drawing operation is facilitated and the temperature of the glass in the receptacle or pot 1 may be maintained at a higher temperature than would be the case if the chilling device were not employed. This is an advantage, as a better product is always secured where the temperature of the main body of glass from which the drawing occurs is relatively high. In other words, the use of the cooling member gives a restricted area of glass which is sufficiently cool and viscous for proper drawing, while at the same time permitting the maintenance of a relatively high temperature in the main body of glass. The chilling of the glass also permits the drawing to be carried on at a higher rate of speed than would otherwise be possible.

The lower edge of the wall 5 preferably just touches the glass although such edge may be a little above or below the surface of the glass, and this wall 5 performs the function of shielding the sheet of glass being formed from the heat radiated from the body of glass outside the shield, thus giving the glass of the sheet an opportunity to harden and set.

Fig. 3 illustrates a modification wherein the shielding member has a vertical wall 11 terminating just above the surface of the body of glass 12, the construction including the use of the pipe 13 being similar to that of Fig. 1.

What I claim is:

The combination with a receptacle carrying a body of molten glass, of a shielding member having its walls tapering downwardly and inwardly to a point adjacent the surface of the glass to provide an elongated drawing opening, and a conduit adapted to carry a cooling fluid lying in the molten glass longitudinally of the drawing opening and spaced below the surface of the body of glass.

WILLIAM G. SHAW.